US012782573B2

(12) United States Patent
Tsuji

(10) Patent No.: US 12,782,573 B2
(45) Date of Patent: Nov. 3, 2026

(54) INSPECTION SYSTEM, EXTRACTION DEVICE, AND INSPECTION METHOD

(71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 833 days.

(21) Appl. No.: 18/029,285

(22) PCT Filed: Oct. 1, 2020

(86) PCT No.: PCT/JP2020/037437

§ 371 (c)(1),
(2) Date: Mar. 29, 2023

(87) PCT Pub. No.: WO2022/070387

PCT Pub. Date: Apr. 7, 2022

(65) Prior Publication Data

US 2023/0367015 A1 Nov. 16, 2023

(51) Int. Cl.
*G01S 17/89* (2020.01)

(52) U.S. Cl.
CPC .................................... *G01S 17/89* (2013.01)

(58) Field of Classification Search
None
See application file for complete search history.

(56) References Cited

U.S. PATENT DOCUMENTS

| | | | | |
|---|---|---|---|---|
| 2003/0043386 A1* | 3/2003 | Froehlich | G01S 17/89 356/601 |
| 2010/0134596 A1* | 6/2010 | Becker | G01S 17/86 348/47 |
| 2019/0339150 A1* | 11/2019 | Schiavone | G01M 3/005 |
| 2020/0064219 A1* | 2/2020 | Akiona | G01M 3/005 |

FOREIGN PATENT DOCUMENTS

| | | |
|---|---|---|
| JP | 2009-079953 A | 4/2009 |
| JP | 2009-168658 A | 7/2009 |
| JP | 2020-037809 A | 3/2020 |
| WO | 2020/161852 A1 | 8/2020 |

OTHER PUBLICATIONS

International Search Report for PCT Application No. PCT/JP2020/037437, mailed on Dec. 22, 2020.

* cited by examiner

*Primary Examiner* — Eric L Bolda

(57) ABSTRACT

An inspection system, an extraction device, an inspection method, an extraction method, and a program that are capable of improving measurement accuracy are provided. An inspection system includes: a measurement device being arranged at a measurement point inside a tunnel, having a reference point, and acquiring a plurality of pieces of data including coordinate values and brightness values of a wall surface of the tunnel as point cloud data by using one or more beams irradiated in irradiation directions at a plurality of different angles to the reference point and receiving reflected light of the beam resulting from scanning the wall surface; a movement means for moving the measurement device to a plurality of measurement points inside the tunnel; and, in the point cloud data acquired by the measurement device for each measurement point, an extraction means for extracting data, based on a distance from the measurement point.

19 Claims, 14 Drawing Sheets

INSPECTION SYSTEM, EXTRACTION DEVICE, AND INSPECTION METHOD

This application is a National Stage Entry of PCT/JP2020/037437 filed on Oct. 1, 2020, the contents of all of which are incorporated herein by reference, in their entirety.

TECHNICAL FIELD

The present invention relates to an inspection system, an extraction device, an inspection method, an extraction method, and a non-transitory computer-readable medium storing a program.

BACKGROUND ART

Patent Literature 1 describes a three-dimensional shape measurement device that measures a shape of an object to be measured by a light cutting method. The three-dimensional shape measurement device of Patent Literature 1 includes a light projecting unit that irradiates an object to be measured with pattern light, an imaging unit, a brightness condition adjustment unit, a control unit, and an arithmetic unit. The imaging unit captures an image including a pattern formed on a surface of the object to be measured by the pattern light. The brightness condition adjustment unit changes at least one of parameters affecting a brightness of the image. The control unit relatively scans the object to be measured and the pattern light in a predetermined direction, and acquires a plurality of images having different scanning positions of the pattern light while changing the above-described parameters. The arithmetic unit extracts, as a target image, an image in which a brightness level falls within a predetermined range among the plurality of images, and acquires a three-dimensional shape of the object to be measured by using brightness information of a pattern associated to the target image.

CITATION LIST

Patent Literature

[Patent Literature 1] Japanese Unexamined Patent Application Publication No. 2009-168658

SUMMARY OF INVENTION

Technical Problem

The three-dimensional shape measurement device of Patent Literature 1 acquires a three-dimensional shape of an object to be measured from brightness. However, the pattern formed on a surface of the object to be measured by pattern light may exhibit an unstable brightness value depending on the shape of the object to be measured. Therefore, there is a problem regarding improvement in measurement accuracy.

The present disclosure has been made in order to solve such a problem, and an object of the present disclosure is to provide an inspection system, an extraction device, an inspection method, an extraction method, and a non-transitory computer-readable medium storing a program that are capable of improving measurement accuracy.

Solution to Problem

An inspection system according to the present disclosure includes: a measurement device arranged at a measurement point in an inside of a tunnel, the measurement device having a reference point and being configured to acquire, as point cloud data, a plurality of pieces of data including a coordinate value and a brightness value of a wall surface of the tunnel by using one or more beams irradiated in irradiation directions at a plurality of different angles with respect to the reference point and receiving reflected light of the beam resulting from scanning the wall surface; a movement means for moving the measurement device to a plurality of the measurement points in an inside of the tunnel; and an extraction means for extracting the data in point cloud data acquired by the measurement device for each measurement point, based on a distance from the measurement point.

Further, an extraction device according to the present disclosure includes, when a measurement device arranged at a measurement point in an inside of a tunnel is moved to a plurality of the measurement points in an inside of the tunnel, the measurement device having a reference point and being configured to acquire, as point cloud data, a plurality of pieces of data including a coordinate value and a brightness value of a wall surface of the tunnel by using one or more beams irradiated in irradiation directions at a plurality of different angles with respect to the reference point and receiving reflected light of the beam resulting from scanning the wall surface, an extraction means for extracting the data in point cloud data acquired by the measurement device for each measurement point, based on a distance from the measurement point.

Further, an inspection method according to the present disclosure includes: causing a measurement device arranged at a measurement point in an inside of a tunnel, the measurement device having a reference point, to acquire, as point cloud data, a plurality of pieces of data including a coordinate value and a brightness value of a wall surface of the tunnel by using one or more beams irradiated in irradiation directions at a plurality of different angles with respect to the reference point and receiving reflected light of the beam resulting from scanning the wall surface; causing a movement means to move the measurement device to a plurality of the measurement points in an inside of the tunnel; and causing an extraction means to extract the data in the point cloud data acquired by the measurement device for each measurement point, based on a distance from the measurement point.

An extraction method according to the present disclosure includes: when a measurement device arranged at a measurement point in an inside of a tunnel is moved to a plurality of the measurement points in an inside of the tunnel, the measurement device having a reference point and being configured to acquire, as point cloud data, a plurality of pieces of data including a coordinate value and a brightness value of a wall surface of the tunnel by using one or more beams irradiated in irradiation directions at a plurality of different angles with respect to the reference point and receiving reflected light of the beam resulting from scanning the wall surface, acquiring the point cloud data for each measurement point, and extracting the data in the point cloud data acquired for each of the measurement points, based on a distance from the measurement point.

Further, a program according to the present disclosure causes a computer to execute: causing a measurement device arranged at a measurement point in an inside of a tunnel, the measurement device having a reference point, to acquire, as point cloud data, a plurality of pieces of data including a coordinate value and a brightness value of a wall surface of the tunnel by using one or more beams irradiated in irradiation directions at a plurality of different angles with respect to the reference point and receiving reflected light of the beam resulting from scanning the wall surface; causing a movement means to move the measurement device to a plurality of the measurement points in an inside of the tunnel; and causing an extraction means to extract the data in the point cloud data acquired by the measurement device for each measurement point, based on a distance from the measurement point.

Further, a program according to the present disclosure causes a computer to execute: when a measurement device arranged at a measurement point in an inside of a tunnel is moved to a plurality of the measurement points in an inside of the tunnel, the measurement device having a reference point and being configured to acquire, as point cloud data, a plurality of pieces of data including a coordinate value and a brightness value of a wall surface of the tunnel by using one or more beams irradiated in irradiation directions at a plurality of different angles with respect to the reference point, and receiving reflected light of the beam resulting from scanning the wall surface, acquiring the point cloud data for each measurement point; and extracting the data in the point cloud data acquired for each of the measurement points, based on a distance from the measurement point.

Advantageous Effects of Invention

According to the present disclosure, it is possible to provide an inspection system, an extraction device, an inspection method, an extraction method, and a non-transitory computer-readable medium storing a program that enable improving measurement accuracy.

EXAMPLE EMBODIMENT

Figure 1:
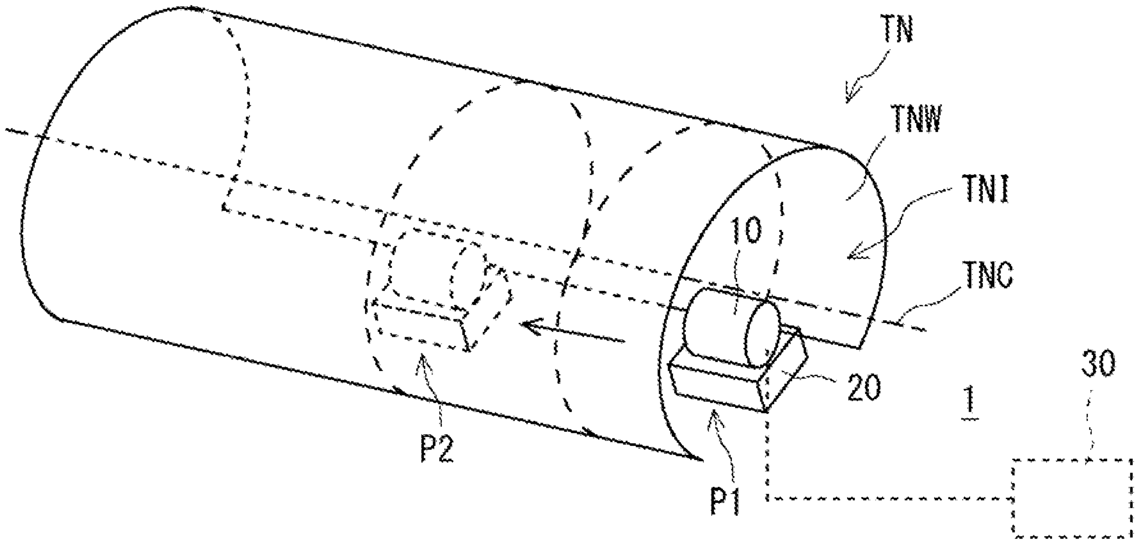
FIG. 1 is a diagram illustrating an inspection system according to a first example embodiment.

Hereinafter, example embodiments will be explained with reference to the drawings. For clarity of explanation, the following description and the drawings are omitted and simplified as appropriate. In the drawings, the same elements are denoted by the same reference numerals, and redundant expiations are omitted as necessary.

First Example Embodiment

First, an inspection system according to a first example embodiment will be explained. The inspection system according to the present example embodiment is, for example, a system that inspects a wall surface of a tunnel.

Figure 2:
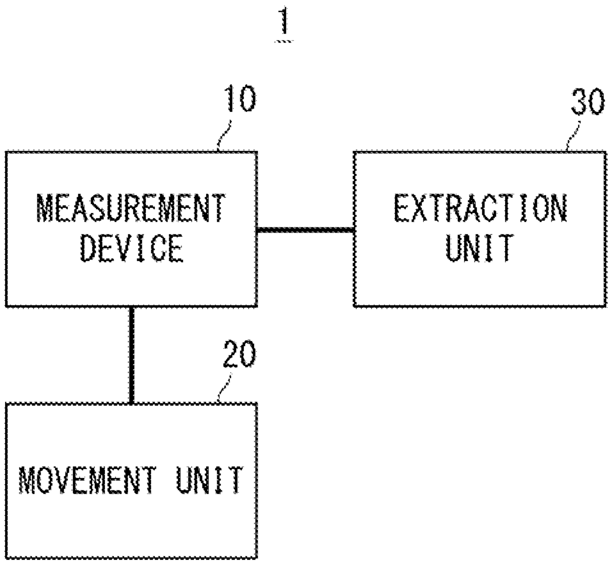
FIG. 2 is a block diagram illustrating the inspection system according to the first example embodiment.

FIG. 1 is a diagram illustrating an inspection system according to the first example embodiment. FIG. 2 is a block diagram illustrating the inspection system according to the first example embodiment. As illustrated in FIGS. 1 and 2, the inspection system 1 includes a measurement device 10, a movement unit 20, and an extraction unit 30. The measurement device 10 has a function as a measurement means, the movement unit 20 has a function as a movement means, and the extraction unit 30 has a function as an extraction means.

The measurement device 10 is arranged at a measurement point P1 of an inside TNI of a tunnel TN. The measurement device 10 irradiates a wall surface TNW of the tunnel TN with a beam such as a laser beam. The measurement device 10 receives reflected light of the beam acquired by scanning the wall surface TNW of the tunnel TN, thereby acquiring a plurality of pieces of data including a coordinate value and a brightness value of the wall surface TNW of the tunnel TN as point cloud data.

The movement unit 20 moves the measurement device 10 across the inside TNI of the tunnel TN. For example, the movement unit 20 moves the measurement device 10 along a center axis TNC of the tunnel TN. The movement unit 20 moves the measurement device 10 to a plurality of measurement points P1 and P2 in the inside TNI of the tunnel TN.

The extraction unit 30 extracts data from the point cloud data acquired by the measurement device 10. For example, the extraction unit 30 extracts data in the point cloud data acquired by the measurement device 10 for each of the measurement points P1 and P2, based on distances from the measurement points P1 and P2. Hereinafter, each configuration of the <measurement device>, the <movement unit>, and the <extraction unit> will be explained in detail.

<Measurement Device>

Figure 3:
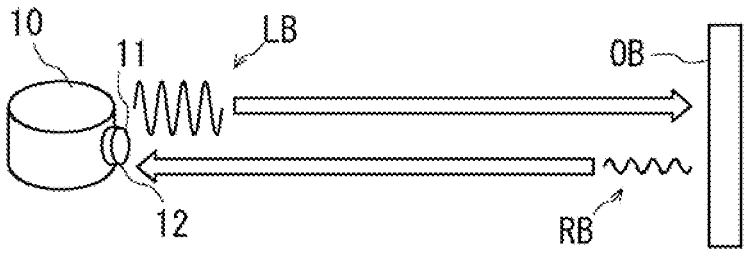
FIG. 3 is a perspective view illustrating the measurement principle of a measurement device in the inspection system according to the first example embodiment.

First, the measurement device 10 will be explained. FIG. 3 is a perspective view illustrating a measurement principle of the measurement device 10 in the inspection system 1 according to the first example embodiment. As illustrated in FIG. 3, the measurement device 10 can acquire a shape of a measurement target OB as point cloud data by causing the measurement target OB to be scanned with a beam LB such as a laser beam. The point cloud data include at least a coordinate value and a brightness value. The measurement device 10 is, for example, a sensor such as Light Detection and Ranging (LiDAR).

For example, the principles of Time of Flight (ToF) LiDAR are as follows. Namely, the LiDAR includes a light emitting unit 11 that emits a beam LB such as a laser beam, and a detection unit 12 that detects reflected light RB reflected on the measurement target OB by the beam LB. The LiDAR detects the reflected light RB reflected on the measurement target OB while scanning the beam LB with respect to the measurement target OB at a predetermined angle. Then, the LiDAR calculates a distance D to the measurement target OB from $D=(t2-t1)/2\times$(speed of light) by using a time t1 until the beam LB reaches the measurement target OB and a time t2 until the reflected light RB reaches the detection unit 12. As a result, the LiDAR can acquire point cloud data having coordinate values and brightness values including a distance to the measurement target OB as scan data in the scanned range.

Figure 4:
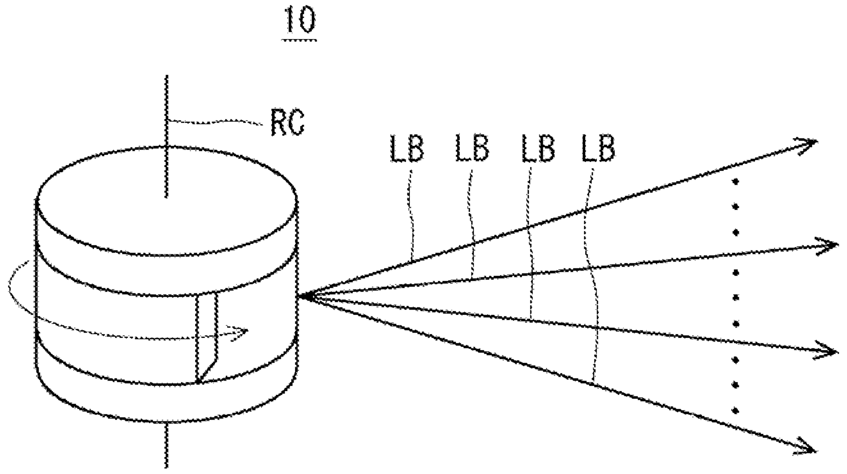
FIG. 4 is a perspective view illustrating a measurement device in the inspection system according to the first example embodiment.

In explaining the present example embodiment, the measurement device 10 irradiates the beam at a plurality of different angles, and a method of changing the irradiation direction of the beam is explained as rotating the light emitting unit 11 of the beam. However, this does not limit a configuration of the measurement device 10 and the method of changing the irradiation direction of the beam to the present method. FIG. 4 is a perspective view illustrating the measurement device 10 in the inspection system 1 according to the first example embodiment. As illustrated in FIG. 4, the measurement device 10 may have a rotation center axis RC. The measurement device 10 may rotate an emission direction of the beam LB by using the rotation center axis RC as a rotation axis. As a result, the measurement device 10 can scan all directions of 360 [deg] around the rotation center axis RC. The irradiation direction of the beam LB in a plane direction orthogonal to the rotation center axis RC of the measurement device 10 is referred to as a vertical plane direction for convenience in this specification.

The measurement device 10 may include a plurality of channels. For example, the measurement device 10 may include a channel for irradiating sixteen beams LB. Each channel of the measurement device 10 may irradiate the beam LB in different directions with respect to the rotation center axis RC. Therefore, the measurement device 10 rotates a plurality of the beams LB irradiated in irradiation directions at a plurality of different angles with respect to the rotation center axis RC about the rotation center axis RC. For example, the measurement device 10 may irradiate the beam LB in different directions having a 2 [deg] interval between adjacent beams LB. Thus, the sixteen beams LB are irradiated within an angle range of 30 [deg] with respect to the center axis. Each channel rotates about the rotation center axis RC.

As described above, the measurement device 10 may be characterized in that (1) a plurality of channels are provided therein, (2) each channel irradiates the beam LB in different directions with respect to the rotation center axis RC, and (3) each channel rotates about the rotation center axis RC. As described above, the configuration of the measurement device 10 and the method of changing the irradiation direction of the beam LB are not limited to the above-described method. For example, the measurement device 10 such as LiDAR electrically changes the irradiation direction of the beam LB by using a technique such as MEMS. In addition, there is also a LiDAR that realizes a wide range of scanning by changing the direction of one beam LB not only to a horizontal direction but also to a vertical direction. Accordingly, the measurement device 10 may also include such a LiDAR. Namely, the measurement device 10 may have a reference point and acquire point cloud data of the wall surface TNW by receiving the reflected light RB of the beam LB resulting from scanning the wall surface TNW of the tunnel TN with one or more beams LB irradiated in the irradiation directions at a plurality of different angles with respect to the reference point.

The inspection system 1 of the present example embodiment can use the brightness value in the point cloud data acquired by the measurement device 10 when inspecting an abnormality of the wall surface TNW of the tunnel TN. For example, the measurement device 10 acquires point cloud data of the wall surface TNW of the tunnel TN. Specifically, the measurement device 10 receives the reflected light RB of the beam LB resulting from scanning the wall surface TNW of the tunnel TN, thereby acquiring a plurality of pieces of data including coordinate values and brightness values of the wall surface TNW of the tunnel TN as point cloud data. Then, the measurement device 10 detects an abnormality such as a crack, based on the brightness value.

However, when the movement unit 20 moves the measurement device 10 to a plurality of the measurement points P1 and P2, the rotation center axis RC of the measurement device 10 cannot always be moved in accordance with the center axis TNC of the tunnel TN. For example, in the beam LB irradiated from the measurement device 10, a direction of the tunnel TN hitting the wall surface TNW (an incident angle of the beam LB) may be changed. The closer the angle at which the beam LB is incident on the wall surface TNW of the tunnel TN is to be perpendicular (the closer the incident angle is to 0 [deg]), the larger the acquired brightness value.

Therefore, the brightness value may change due to a factor different from a state of the wall surface TNW of the tunnel TN. Therefore, it is difficult to improve the accuracy of detecting the abnormality in this state. Hereinafter, a problem when the measurement device 10 inspects the wall surface TNW of the tunnel TN will be specifically explained.

Figure 5:
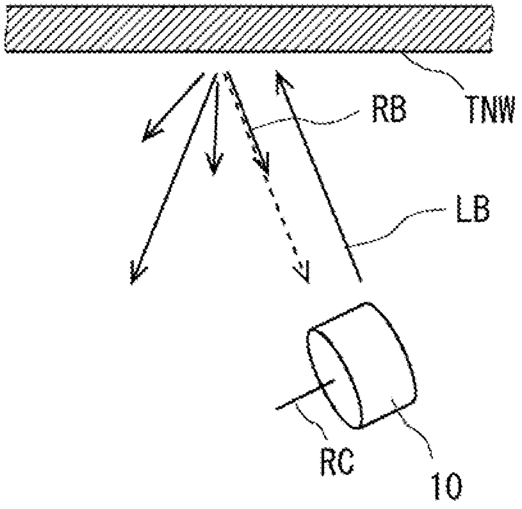
FIG. 5 is a diagram illustrating a measurement device that measures a wall surface of a tunnel in the inspection system according to the first example embodiment.
Figure 6:
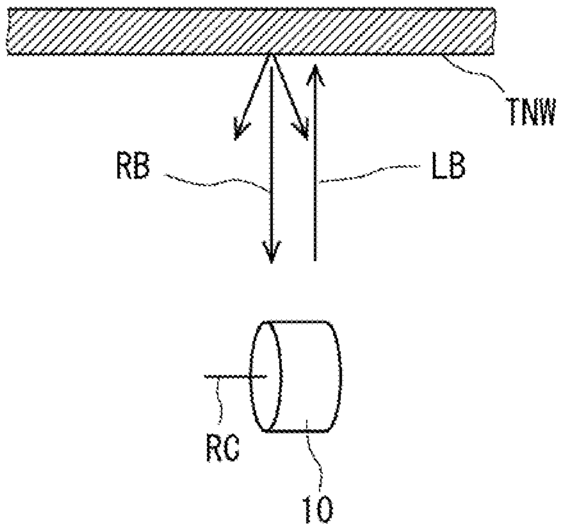
FIG. 6 is a diagram illustrating a measurement device that measures the wall surface of the tunnel in the inspection system according to the first example embodiment.

FIGS. 5 and 6 are diagrams each illustrating the measurement device 10 that measures the wall surface TNW of the tunnel TN in the inspection system 1 according to the first example embodiment. As illustrated in FIG. 5, when the beam LB is obliquely incident on the wall surface TNW of the tunnel TN, a component of the reflected light RB to be reflected to the measurement device 10 decreases. Therefore, the brightness value measured by the measurement device 10 is small.

On the other hand, as illustrated in FIG. 6, when the beam LB is vertically incident on the wall surface TNW of the tunnel TN, the reflected light RB to the measurement device 10 is large. Therefore, the brightness value measured by the measurement device 10 is large.

As described above, the closer the angle at which the beam LB is incident on the wall surface TNW of the tunnel TN is to be perpendicular (the closer the incident angle is to 0 [deg]), the larger the acquired brightness value. The point cloud data include at least coordinate values (X, Y, Z, etc.) in a three-dimensional space and a brightness value (Intensity) indicating an intensity of the reflected light RB. When the rotation center axis RC of the measurement device 10 is not parallel to a direction of the center axis TNC of the tunnel TN, there is a problem that a value of the brightness value included in the data (point cloud data) acquired by scanning the wall surface TNW of the tunnel TN is not stable. The inspection system 1 of the present example embodiment solves this problem.

<Movement Unit>

Next, the movement unit 20 will be explained. The movement unit 20 moves the measurement device 10 to a plurality of the measurement points P1 and P2. The plurality of measurement points P1 and P2 are collectively referred to as a measurement point P. When a specific measurement point P is indicated, the measurement point P1 or P2 is denoted by a reference numeral.

The movement unit 20 is, for example, a traveling vehicle, a drone, or the like. The movement unit 20 may be an automatic traveling vehicle that automatically travels under automatic control. Further, the movement unit 20 may be a person who walks while carrying the measurement device 10. The movement unit 20 advances the inside TNI of the tunnel TN while causing the measurement device 10 to scan the wall surface TNW of the tunnel TN.

The tunnel TN has the center axis TNC. The movement unit 20 moves the measurement device 10 along the center axis TNC. For example, when the center axis TNC of the tunnel TN extends in one direction, the movement unit 20 moves the measurement device 10 in a direction parallel to the center axis TNC. When the center axis TNC of the tunnel TN is curved, the movement unit 20 moves the measurement device 10 along a path curved with the same curvature as the curved center axis TNC.

The movement unit 20 aligns the rotation center axis RC of the measurement device 10 with a moving direction of the measurement device 10. For example, the movement unit 20 moves the measurement device 10 in such a way that the rotation center axis RC of the measurement device 10 faces the moving direction of the measurement device 10. In this case, the point cloud data acquired by the measurement device 10 is acquired by the measurement device 10 at each measurement point P when the measurement device 10 is moved by aligning the rotation center axis RC of the measurement device 10 with the moving direction of the measurement device 10.

Further, the movement unit 20 aligns the rotation center axis RC of the measurement device 10 with the center axis TNC of the tunnel TN. For example, the movement unit 20 moves the measurement device 10 in such a way that the rotation center axis RC of the measurement device 10 faces a direction of the center axis TNC of the tunnel TN. In this case, the point cloud data acquired by the measurement device 10 are acquired by the measurement device 10 at each measurement point P when the measurement device 10 is moved by aligning the rotation center axis RC of the measurement device 10 with the center axis TNC of the tunnel TN.

<Extraction Unit>

Figure 7:
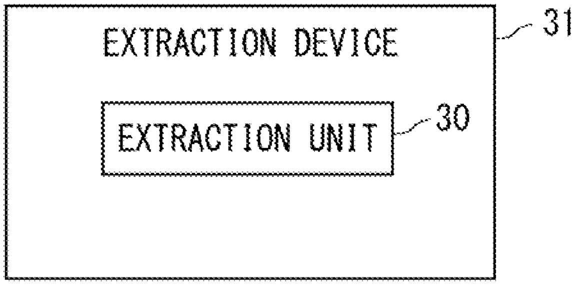
FIG. 7 is a block diagram illustrating an extraction unit in the inspection system according to the first example embodiment.

Next, the extraction unit 30 will be explained. FIG. 7 is a block diagram illustrating the extraction unit 30 in the inspection system 1 according to the first example embodiment. As illustrated in FIG. 7, the extraction unit 30 may be provided in the extraction device 31 and function as a single unit. The extraction unit 30 may be configured by hardware including a microcomputer composed of, for example, a Central Processing Unit (CPU), a Read Only Memory (ROM), a Random Access Memory (RAM), an interface unit (I/F), and the like. The CPU performs extraction processing, control processing, and the like. Further, the CPU may perform calculation processing and storage processing. The ROM stores an extraction program, a control program, and the like that are executed by the CPU. The RAM stores various types of data such as point cloud data. The interface unit (I/F) inputs and outputs a signal to and from the outside. CPU, ROM, RAM, and the interface unit are connected to each other via a data bus or the like. The extraction device 31 provided with the extraction unit 30 may control the entire inspection system 1 including not only the extraction processing but also controls of the measurement device 10 and the movement unit 20.

The extraction unit 30 is connected to the measurement device 10 in a state in which information such as data can be transmitted and received by a wired or wireless communication means. The extraction unit 30 may be connected to the movement unit 20 in a state in which a control signal or the like can be transmitted and received by a wired or wireless communication means.

Figure 8:
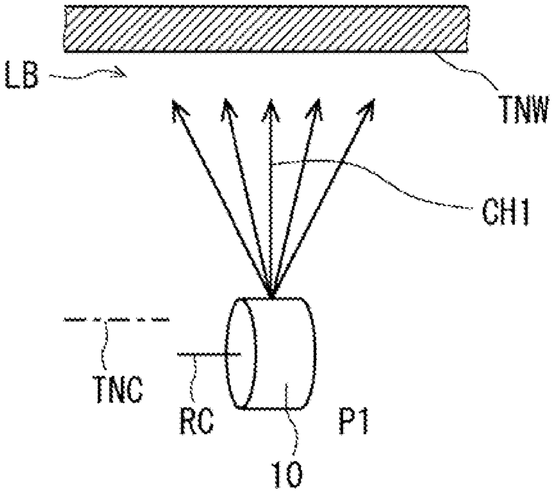
FIG. 8 is a diagram illustrating a channel including data extracted by an extraction unit in the inspection system according to the first example embodiment.
Figure 9:
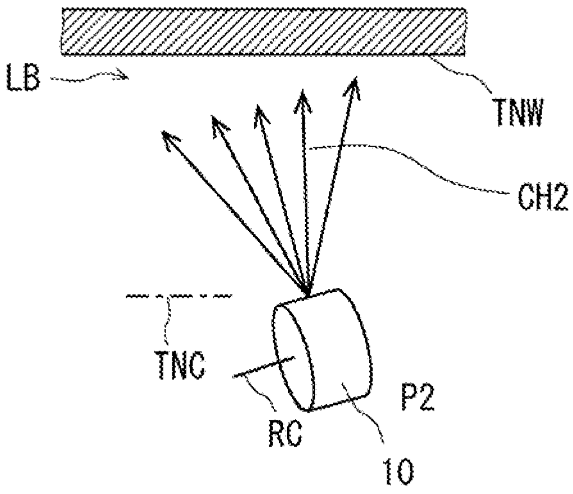
FIG. 9 is a diagram illustrating a channel including data extracted by an extraction unit in the inspection system according to the first example embodiment.

FIGS. 8 and 9 are diagrams illustrating a channel including data extracted by the extraction unit 30 in the inspection system 1 according to the first example embodiment. As illustrated in FIG. 8, when the rotation center axis RC of the measurement device 10 is parallel to the center axis TNC of the tunnel TN, the extraction unit 30 extracts data acquired by the beam LB irradiated in a direction of a channel CH1 orthogonal to the rotation center axis RC. In the beam LB of the channel CH1, an angle of incidence on the wall surface TNW of the tunnel TN is closest to perpendicular (the angle of incidence is smallest). The data acquired by the beam LB of the channel CH1 are data indicating a shortest distance from the measurement point P1.

On the other hand, as illustrated in FIG. 9, when the rotation center axis RC of the measurement device 10 is not parallel to the center axis TNC of the tunnel TN, the extraction unit 30 extracts data acquired by the beam LB irradiated in a direction of a channel CH2 inclined to the rotation center axis RC. The beam LB of the channel CH2 has an angle of incidence on the wall surface TNW of the tunnel TN closest to be perpendicular (the angle of incidence is smallest). The data acquired by the beam LB of the channel CH2 are data indicating the shortest distance from a measurement point P2.

As described above, the extraction unit 30 extracts data from the point cloud data acquired by the measurement device 10, based on the distance from the measurement point P to the wall surface TNW. Specifically, when the measurement device 10 is moved to the plurality of measurement points P1 and P2 in the inside TNI of the tunnel TN, the extraction unit 30 extracts data in the point cloud data acquired by the measurement device 10 for each of the measurement points P1 and P2, based on the distances from the measurement points P1 and P2.

The extraction unit 30 may extract data indicating the shortest distance from the measurement point P in the point cloud data acquired by the measurement device 10. Namely, the extraction unit 30 extracts data having the shortest distance from the measurement point P to the wall surface TNW of the tunnel TN. The extraction unit 30 extracts data on a vertical plane orthogonal to the rotation center axis RC of the measurement device 10.

The extraction unit 30 employs the measurement device 10 capable of irradiating the beams LB of a plurality of channels (a plurality of beams) in different irradiation directions, and adopts data having the closest distance to the wall surface TNW of the tunnel TN among the data acquired at a certain measurement point P as the brightness value of a location thereof. Accordingly, the above-described problem is solved. The beam LB having the closest distance to the wall surface TNW of the tunnel TN can be expected to be incident at an angle close to perpendicular to the wall surface TNW. Therefore, information on the brightness value can be stably acquired.

In the point cloud data acquired by the measurement device 10, the extraction unit 30 may extract data other than the data indicating the shortest distance from the measurement point P when extracting the data, based on the distance from the measurement point P. For example, data indicating a second shortest distance may be extracted, or data indicating an average value may be extracted.

<Data Storage Unit>

Figure 10:
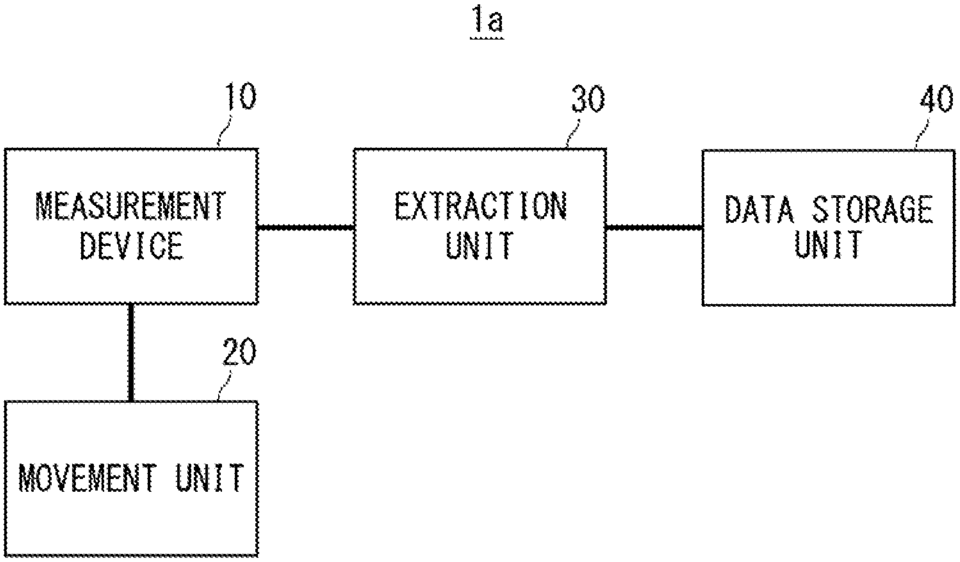
FIG. 10 is a block diagram illustrating another inspection system according to the first example embodiment.

Next, as another example of the first example embodiment, an inspection system including a data storage unit will be explained. FIG. 10 is a block diagram illustrating another inspection system according to the first example embodiment. As illustrated in FIG. 10, another inspection system 1*a* further includes a data storage unit 40. The data storage unit 40 has a function as a data storage unit that stores data. The data storage unit 40 is, for example, a storage medium such as a RAM or a hard disk. The data storage unit 40 may be provided on a cloud. The data storage unit 40 may function alone as a data storage device. The data storage unit 40 is connected to the extraction unit 30 in a state in which information such as data can be transmitted and received by a wired or wireless communication means.

Figure 11:
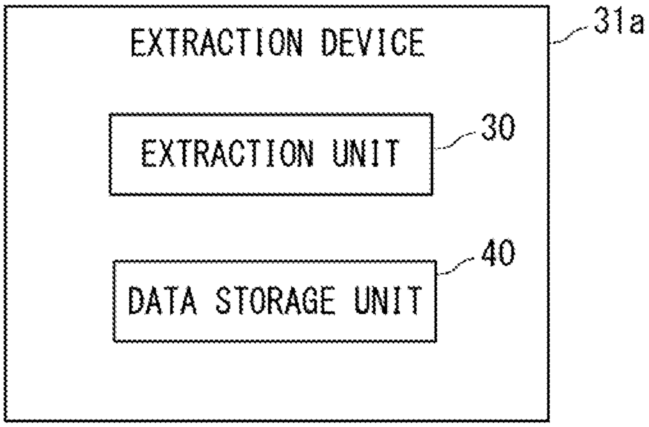
FIG. 11 is a block diagram illustrating an extraction unit and a data storage unit in still another inspection system according to the first example embodiment.

FIG. 11 is a block diagram illustrating the extraction unit 30 and the data storage unit 40 in still another inspection system according to the first example embodiment. As illustrated in FIG. 11, the data storage unit 40 may be provided in an extraction device 31*a* including the extraction unit 30. In this case, the extraction device 31*a* including the extraction unit 30 and the data storage unit 40 may function as a single unit.

The data storage unit 40 stores data. The data storage unit 40 may store data acquired by the measurement device 10, or may store data extracted by the extraction unit 30. When storing the extracted data, the data storage unit 40 may store the data together with information indicating the measurement point P. For example, the extraction unit 30 causes the data storage unit 40 to store data together with information indicating the measurement points P1 and P2.

Further, the data storage unit 40 may store data converted into coordinate values of a common coordinate system between the measurement points P1 and P2 by using information indicating the measurement point P. For example, the extraction unit 30 causes the data storage unit 40 to store data converted into coordinate values of a common coordinate system between the measurement points P1 and P2. The information indicating the measurement point P may be acquired by mounting wheel encoder on the movement unit 20, or may be calculated, based on a positional relationship with the beacon by installing a beacon or the like indicating a current position on the wall surface TNW of the tunnel TN.

<Inspection Method>

Figure 12:
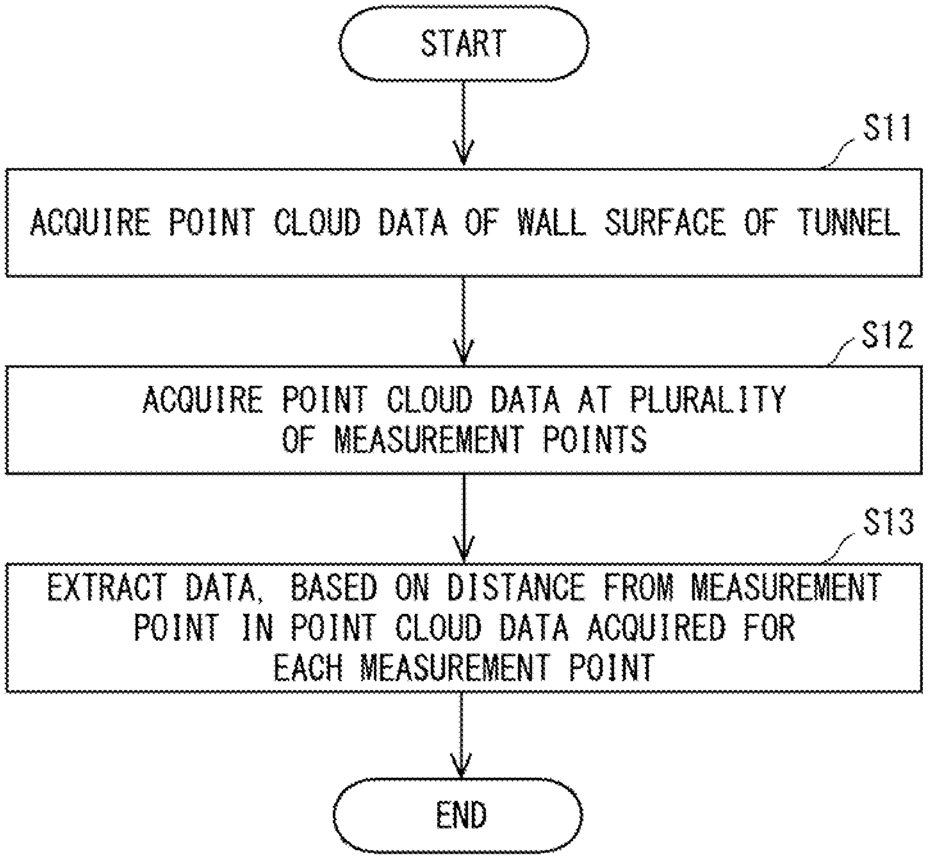
FIG. 12 is a flowchart illustrating an inspection method according to the first example embodiment.

Next, the inspection method of the present example embodiment will be explained. FIG. 12 is a flowchart illustrating the inspection method according to the first example embodiment. As illustrated in step S11 of FIG. 12, point cloud data of the wall surface TNW of the tunnel TN is acquired. Specifically, the measurement device 10 is arranged at the measurement point P of the inside TNI of the tunnel TN. The measurement device 10 has the rotation center axis RC, and rotates a plurality of beams LB irradiated in irradiation directions at a plurality of different angles with respect to the rotation center axis RC about the rotation center axis RC. Thus, by receiving the reflected light RB of the beam LB acquired by scanning the wall surface TNW of the tunnel TN, the measurement device 10 is caused to acquire a plurality of pieces of data including coordinate values and brightness values of the wall surface TNW of the tunnel TN as point cloud data.

Next, as illustrated in step S12, the point cloud data are acquired at a plurality of the measurement points P1 and P2. Specifically, in the inside TNI of the tunnel TN, the movement unit 20 moves the measurement device 10 to a plurality of the measurement points P1 and P2.

When the measurement device 10 is moved, the movement unit 20 may be caused to align the rotation center axis RC of the measurement device 10 with the moving direction of the measurement device 10. Further, the movement unit 20 may be caused to align the rotation center axis RC of the measurement device 10 with the center axis TNC of the tunnel TN.

Next, as illustrated in step S13, in the point cloud data acquired for each of the measurement points P1 and P2, data are extracted based on the distances from the measurement points P1 and P2. Specifically, the extraction unit 30 is caused to extract data, based on the distances from the measurement points P1 and P2.

When the extraction unit 30 is caused to extract data, the extraction unit 30 may extract data indicating the shortest distance from the measurement point P. Further, the extraction unit 30 may be caused to extract data on a vertical plane orthogonal to the rotation center axis RC.

The data storage unit 40 may be caused to store the data acquired by the measurement device 10 or the data extracted by the extraction unit 30 together with the information indicating the measurement point P. In addition, the data storage unit 40 may be caused to store data converted into coordinate values of a common coordinate system between the measurement points P may be stored by using the information indicating the measurement point P.

In this way, by extracting data indicating the wall surface TNW of the tunnel TN, the wall surface TNW of the tunnel TN can be inspected.

<Extraction Method>

Figure 13:
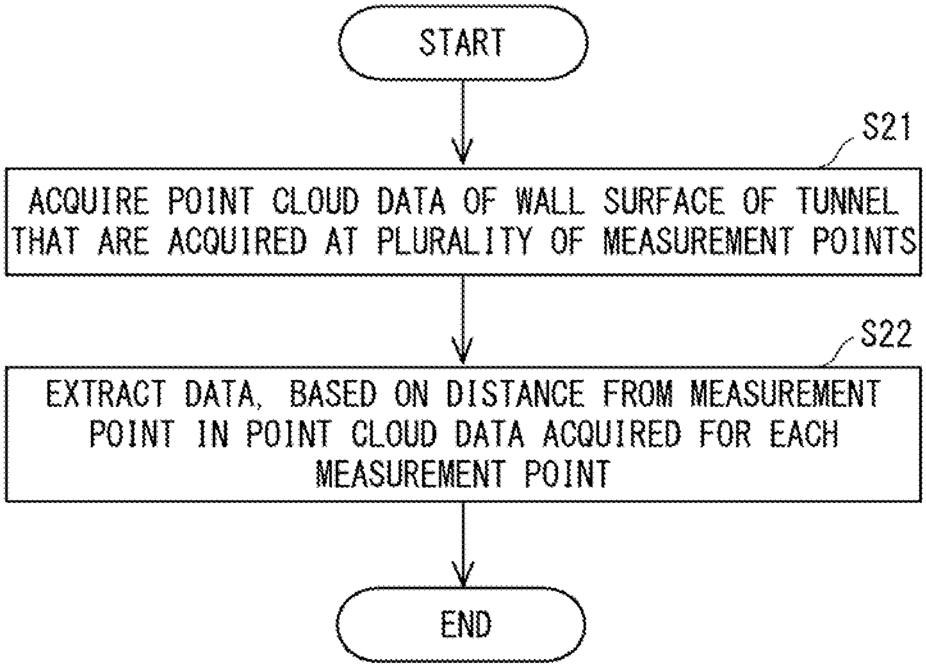
FIG. 13 is a flowchart illustrating an extraction method according to the first example embodiment.

Next, an extraction method performed by the extraction unit 30 or the extraction unit 30 provided in the extraction device 31 will be explained. FIG. 13 is a flowchart illustrating an extraction method according to the first example embodiment. As illustrated in step S21 of FIG. 13, point cloud data of the wall surface TNW of the tunnel TN acquired at a plurality of the measurement points P1 and P2 are acquired. Specifically, when the measurement device 10 is moved to a plurality of the measurement points P1 and P2 in the inside TNI of the tunnel TN, point cloud data are acquired for each of the measurement points P1 and P2.

The point cloud data may be acquired by the measurement device 10 at each measurement point P when the measurement device 10 is moved by aligning the rotation center axis RC of the measurement device 10 with the moving direction of the measurement device 10. The point cloud data may be acquired by the measurement device 10 at each measurement point P when the measurement device 10 is moved by aligning the rotation center axis RC of the measurement device 10 with the center axis TNC of the tunnel TN.

Next, as illustrated in step S22 of FIG. 13, in the point cloud data acquired for each of the measurement points P1 and P2, data are extracted based on the distances from the measurement points P1 and P2.

When the extraction unit 30 is caused to extract data, the extraction unit 30 may be caused to extract data indicating the shortest distance from the measurement points P1 and P2. Further, the extraction unit 30 may be caused to extract data on a vertical plane orthogonal to the rotation center axis RC.

The data storage unit 40 may be caused to store the data acquired by the measurement device 10 or the data extracted by the extraction unit 30 together with the information indicating the measurement point P. In addition, the data storage unit 40 may be caused to store data converted into coordinate values of a common coordinate system between the measurement points P by using information indicating the measurement point P. In this way, the extraction unit extracts data.

Next, effects of the present example embodiment will be explained. The inspection system 1 of the present example embodiment extracts data, based on the distance from the measurement point P, i.e., the distance from the measurement point P to the wall surface TNW, in the point cloud data acquired by the measurement device 10 for each measurement point P. Therefore, since the data by the beam LB whose angle incident on the wall surface TNW of the tunnel TN is close to the perpendicular are extracted, it is possible to improve measurement accuracy of the data indicating the wall surface TNW of the tunnel TN.

When extracting the data indicating the shortest distance from the measurement point P, the extraction unit 30 can make the angle incident on the wall surface TNW closer to the perpendicular, and can further improve the measurement accuracy. Further, since the extraction unit 30 extracts the data on the vertical plane orthogonal to the rotation center axis RC, it is possible to further improve the measurement accuracy.

Since the movement unit 20 aligns the rotation center axis RC of the measurement device 10 with the moving direction of the measurement device 10, the angle of incidence on the wall surface TNW of the tunnel TN can be made closer to the perpendicular. Further, since the movement unit 20 aligns the rotation center axis RC of the measurement device 10 with the center axis TNC of the tunnel TN, the angle of incidence on the wall surface TNW of the tunnel TN can be made closer to the perpendicular. Accordingly, it is possible to improve the measurement accuracy of the data indicating the wall surface TNW of the tunnel TN.

Since the data storage unit 40 stores the data together with the information indicating the measurement point P, the extraction processing time can be shortened. In addition, a storage amount of data can be increased, and a storage capacity of the inspection system 1 can be increased.

Second Example Embodiment

Next, an inspection system according to a second example embodiment will be explained. A hole or the like may be formed in a wall surface of a tunnel TN. In this case, it may happen that a channel to be a shortest is not selected when the distance from the measurement point P is original.

Figure 14:
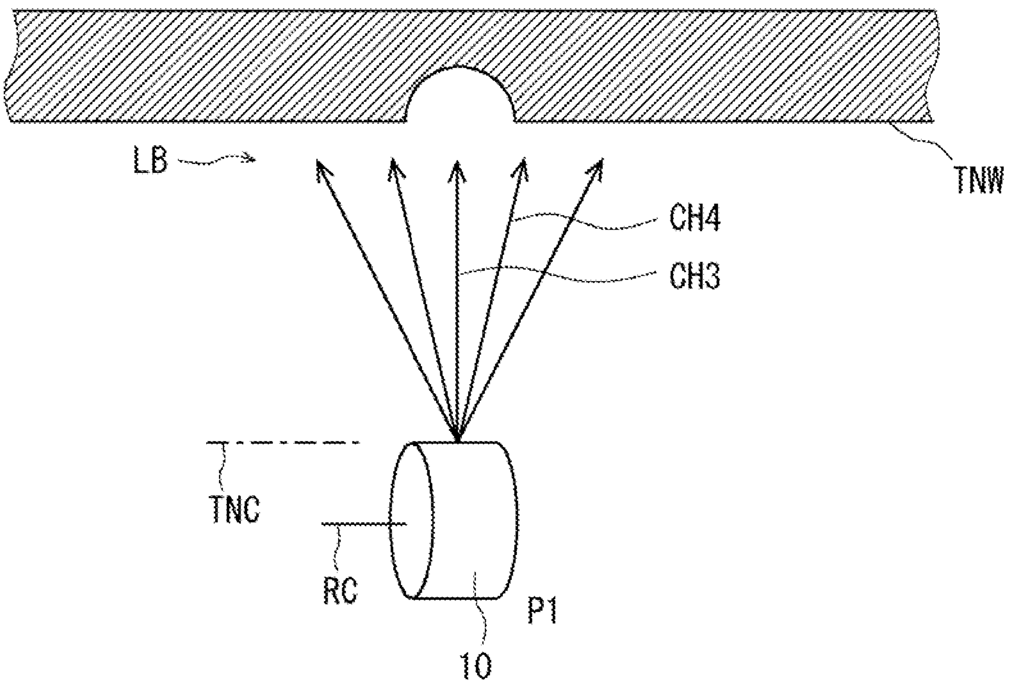
FIG. 14 is a diagram illustrating a plurality of beams irradiated by a hole of the wall surface of the tunnel and a measurement unit.

FIG. 14 is a diagram illustrating a hole in a wall surface TNW of the tunnel TN and a plurality of beams LB irradiated by the measurement device 10. As illustrated in FIG. 14, for example, in a case where the rotation center axis RC of the measurement device 10 is aligned with the center axis TNC of the tunnel TN, when it is originally, data by a beam LB of a channel CH3 are extracted as data indicating a shortest distance from the measurement point P1 to the wall surface TNW of the tunnel TN. However, due to the presence of a hole in the wall surface TW, data by a beam LB of a channel CH4 are extracted as data indicating the shortest distance from the measurement point P. Therefore, it is possible that the channel CH3 having the shortest distance from the measurement point P is not extracted due to the presence of the hole when there is no hole in the wall surface TW. Therefore, the inspection system of the present example embodiment calculates a calculation surface approximated to an original shape of the wall surface TNW of the tunnel TN.

Figure 15:
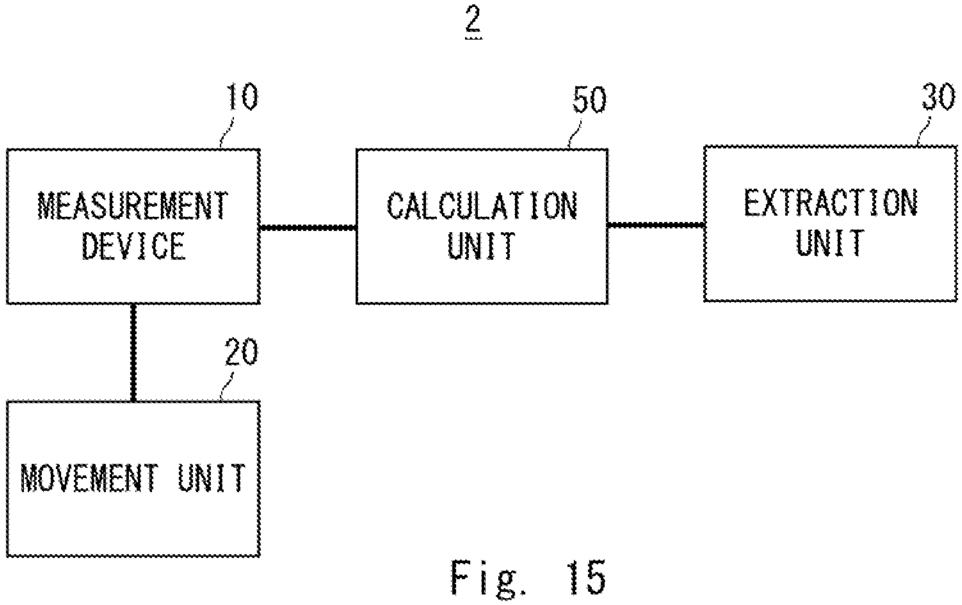
FIG. 15 is a block diagram illustrating an inspection system according to a second example embodiment.

FIG. 15 is a block diagram illustrating an inspection system according to the second example embodiment. As illustrated in FIG. 15, an inspection system 2 of the present example embodiment further includes a calculation unit 50. The calculation unit 50 has a function as a calculation means. The calculation unit 50 may function alone as a calculation device. The calculation unit 50 is connected to the measurement device 10 in a state in which information such as data can be transmitted and received by a wired or wireless communication means. The calculation unit 50 is connected to the extraction unit 30 in a state in which information such as data can be transmitted and received by a wired or wireless communication means. The calculation unit 50 calculates a calculation surface approximated to the original shape of the wall surface TNW of the tunnel TN, based on the coordinate values of data included in the point cloud data acquired by the measurement device 10.

The calculation unit 50 may calculate the calculation surface by using a plurality of pieces of point cloud data measured at a plurality of the measurement points P. For example, the calculation unit 50 may calculate the calculation surface, based on the least squares method or the like from the plurality of pieces of point cloud data measured at the plurality of measurement points P. The calculation unit 50 may calculate the calculation surface from model data such as a design drawing of the tunnel TN.

Figure 16:
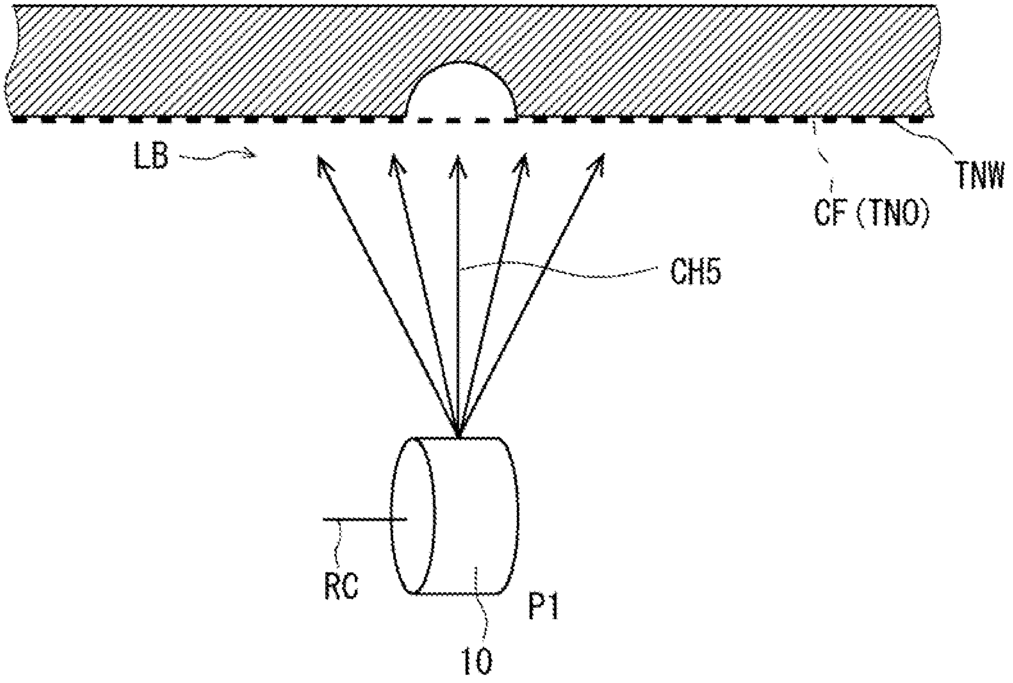
FIG. 16 is a diagram illustrating a calculation surface calculated by a calculation unit in the inspection system according to the second example embodiment.

FIG. 16 is a diagram illustrating a calculation surface calculated by the calculation unit 50 in the inspection system 2 according to the second example embodiment. As illustrated in FIG. 16, the calculation unit 50 calculates a calculation surface CF. The calculation surface CF is approximated to an original type TNO of the wall surface TW of the tunnel TN. The original type TNO of the wall surface TW is the original wall surface TW of the tunnel TN, and is a reference surface in a case of inspecting an occurrence of abnormality such as a hole.

The extraction unit 30 of the present example embodiment extracts data, based on a distance from the measurement point P1 to the calculation surface CF. For example, the extraction unit 30 may extract data indicating the shortest distance from the measurement point P1 to the calculation surface CF. Thus, the data by a beam LB of a channel CH5 is extracted as data indicating the shortest distance from the measurement point P1 to the original type TNO of the wall surface TNW of the tunnel TN. The data of the channel CH5 includes information of holes formed in the wall surface TW. Therefore, the inspection system 2 can inspect the hole of the wall surface TW.

Figure 17:
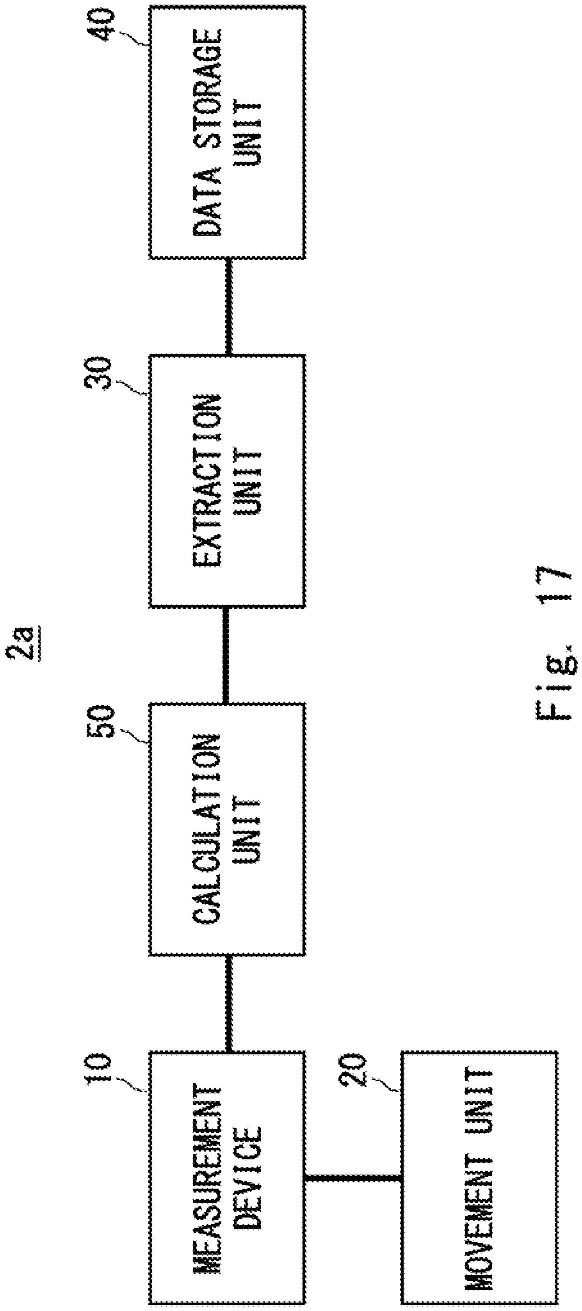
FIG. 17 is a block diagram illustrating another inspection system according to the second example embodiment.

The inspection system 2 of the present example embodiment may include a data storage unit 40. FIG. 17 is a block diagram illustrating another inspection system according to the second example embodiment. As illustrated in FIG. 17, another inspection system 2*a* includes a data storage unit 40. The data storage unit 40 of the present example embodiment can store the calculation surface CF in addition to the configuration and operation of the data storage unit 40 of the inspection system 1 described above.

Figure 18:
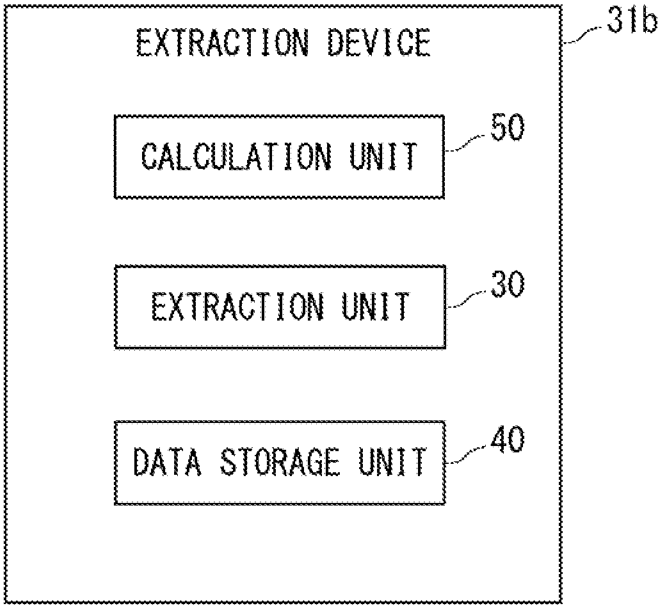
FIG. 18 is a block diagram illustrating a calculation unit, an extraction unit, and a data storage unit in still another inspection system according to the second example embodiment.

FIG. 18 is a block diagram illustrating a calculation unit, an extraction unit, and a data storage unit in still another inspection system according to the second example embodiment. As illustrated in FIG. 18, the calculation unit 50 and the data storage unit 40 may be provided in an extraction device 31*b* including the extraction unit 30. In this case, the extraction device 31*b* including the calculation unit 50, the extraction unit 30, and the data storage unit 40 may function as a single unit.

Figure 19:
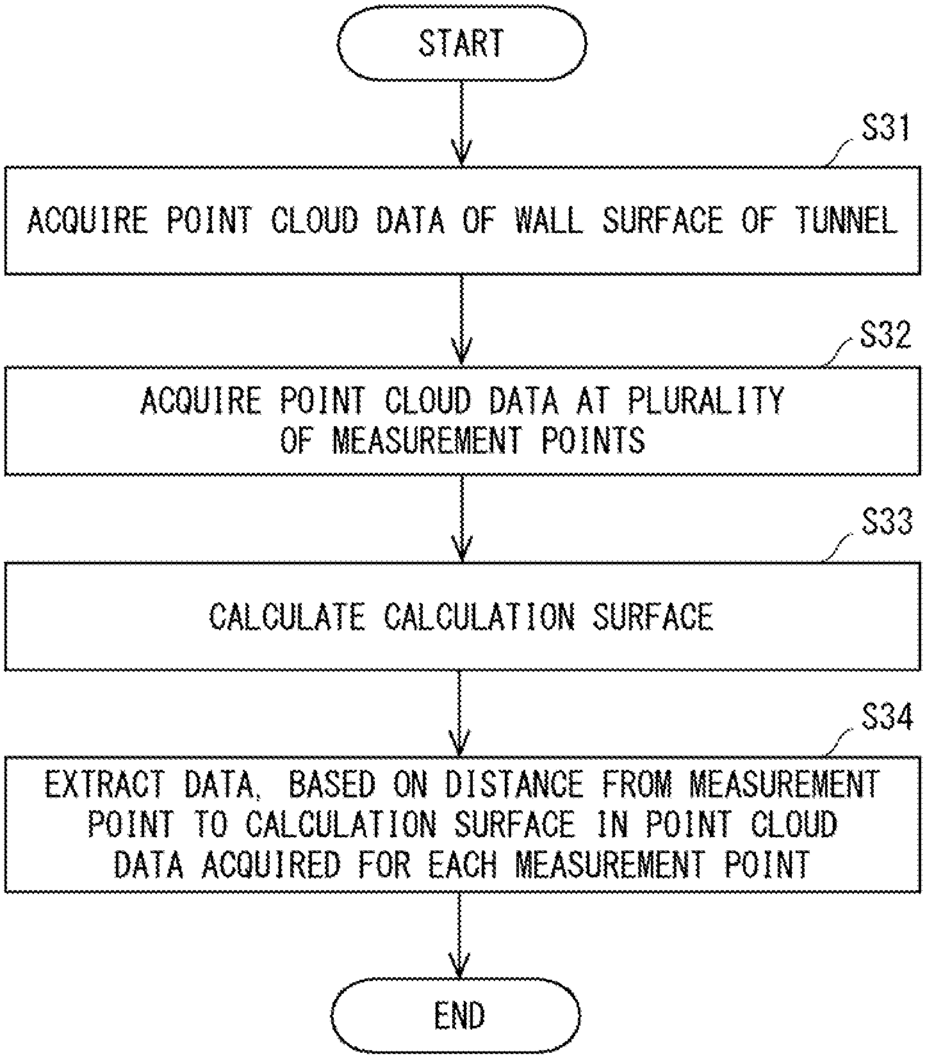
FIG. 19 is a flowchart illustrating an inspection method according to the second example embodiment.

Next, the inspection method of the present example embodiment will be explained. FIG. 19 is a flowchart illustrating an inspection method according to the second example embodiment. Steps S31 and S32 in FIG. 19 are the same as steps S11 and S12 in the inspection method of the first example embodiment.

Next, as illustrated in step S33, a calculation surface is calculated. Specifically, the calculation surface CF approximated to the original type TNO of the wall surface TW of the tunnel TN is calculated by the calculation unit 50, based on the coordinate values of the data included in the point cloud data acquired by the measurement device 10. The calculation unit 50 may be caused to calculate the calculation surface CF by using the plurality of pieces of point cloud data acquired at a plurality of the measurement points P1 and P2.

Next, as illustrated in step S34, in the point cloud data acquired for each measurement point P, data are extracted, based on the distance from the measurement point P to the calculation surface CF. Specifically, the extraction unit 30 is caused to extract the data, based on the distance from the measurement point P to the calculation surface CF. The extraction unit 30 may extract data indicating the shortest distance from the measurement point P to the calculation surface CF. The data indicating the shortest distance from the measurement point P to the calculation surface CF may include information of a hole formed in the wall surface TW. In this way, the inspection system 2 can inspect the wall surface TW of the tunnel TN.

Figure 20:
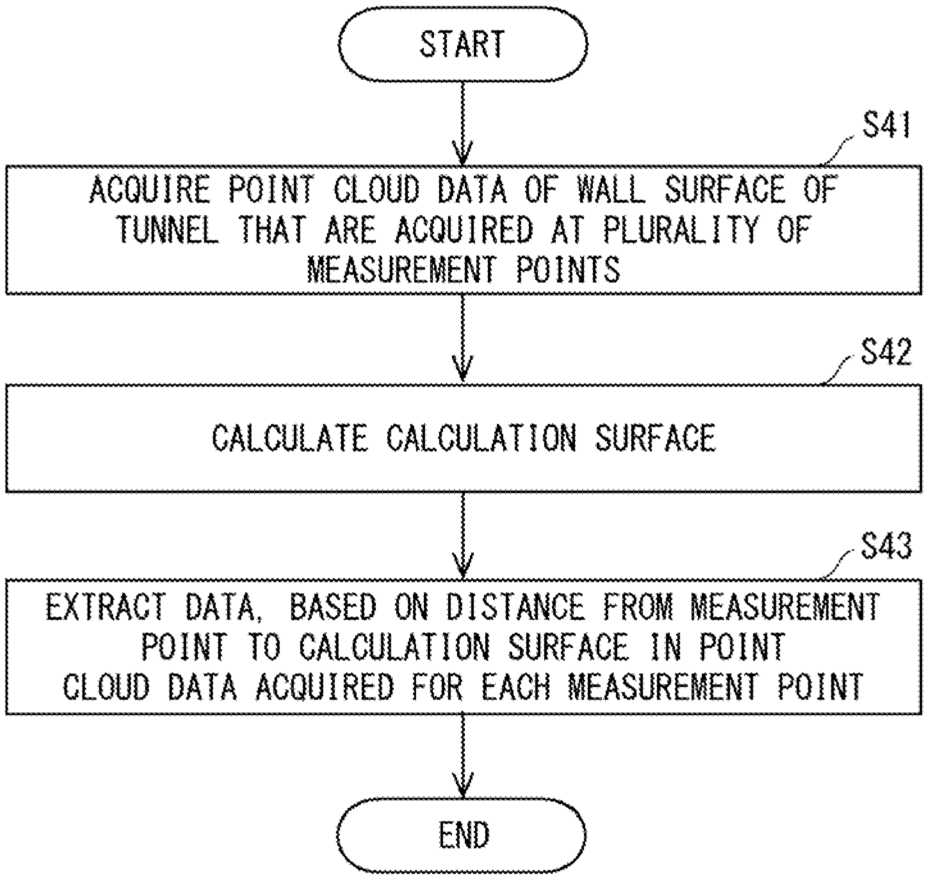
FIG. 20 is a flowchart illustrating an extraction method according to the second example embodiment.

Next, the extraction method of the present example embodiment will be explained. FIG. 20 is a flowchart illustrating an extraction method according to the second example embodiment. Step S41 in FIG. 20 is the same as step S21 in the extraction method of the first example embodiment.

Next, as illustrated in step S42, the calculation surface CF is calculated. Specifically, the calculation surface CF approximated to the original type TNO of the wall surface TW of the tunnel TN is calculated by the calculation unit 50, based on the coordinate values of the data included in the point cloud data acquired by the measurement device 10. The calculation unit 50 may be caused to calculate the calculation surface CF by using the plurality of pieces of point cloud data acquired at a plurality of the measurement points P1 and P2.

Next, as illustrated in step S43, in the point cloud data acquired for each measurement point P, data are extracted, based on the distance from the measurement point P to the calculation surface CF. In this way, the extraction unit 30 extracts data indicating the wall surface TW of the tunnel TN.

The inspection system 2 of the present example embodiment includes a calculation unit 50 that calculates the calculation surface CF approximated to the original type TNO of the wall surface TW of the tunnel TN. Then, the extraction unit 30 extracts data in the point cloud data acquired for each measurement point P, based on the distance from the measurement point P to the calculation surface CF. Therefore, even when a hole is formed in the wall surface TW of the tunnel TN, the angle of incidence on the original type TNO of the wall surface TW of the tunnel TN can be made closer to the perpendicular, and the measurement accuracy of measuring the wall surface TNW of the tunnel TN can be improved. Therefore, it is possible to inspect an abnormality such as a hole of the tunnel TN. Other configurations and effects are included in the description of the first example embodiment.

Although the present invention has been explained with reference to the first and second example embodiments, the present invention is not limited to the first and second example embodiments. Various modifications that can be understood by a person skilled in the art within the scope of the present invention can be made to the configuration and details of the present invention. For example, an example embodiment in which the configurations of the first and second example embodiments are combined is also included in the scope of the technical idea.

Further, a program that causes a computer to execute the inspection method and the extraction method of the first and second example embodiments is also included in the technical scope of the first and second example embodiments.

Some or all of the above-described example embodiments may be described as the following supplementary notes, but are not limited thereto.

Supplementary Note 1

An inspection system including:

a measurement device arranged at a measurement point in an inside of the tunnel, the measurement device having a reference point and being configured to acquire, as point cloud data, a plurality of pieces of data including a coordinate value and a brightness value of a wall surface of the tunnel by using one or more beams irradiated in irradiation directions at a plurality of different angles with respect to the reference point and receiving reflected light of the beam resulting from scanning the wall surface;

a movement means for moving the measurement device to a plurality of the measurement points in an inside of the tunnel; and an extraction means for extracting the data in point cloud data acquired by the measurement device for each measurement point, based on a distance from the measurement point.

Supplementary Note 2

The inspection system according to Supplementary note 1, wherein the measurement device has a rotation center axis passing through the reference point, rotates one or more of the beams irradiated in irradiation directions at a plurality of different angles with respect to the rotation center axis around the rotation center axis, and receives reflected light of the beam resulting from scanning a wall surface of the tunnel, thereby acquiring the point cloud data.

Supplementary Note 3

The inspection system according to Supplementary note 2, wherein the extraction means extracts data on a vertical plane orthogonal to the rotation center axis.

Supplementary Note 4

The inspection system according to Supplementary note 2 or 3, wherein the movement means aligns the rotation center axis with a moving direction of the measurement device.

Supplementary Note 5

The inspection system according to any one of Supplementary notes 2 to 4, wherein the movement means aligns the rotation center axis with a center axis of the tunnel.

Supplementary Note 6

The inspection system according to any one of Supplementary notes 1 to 5, wherein the extraction means extracts data indicating a shortest distance from the measurement point.

Supplementary Note 7

The inspection system according to any one of Supplementary notes 1 to 6, further including a data storage means for storing the data together with information indicating the measurement point.

Supplementary Note 8

The inspection system according to Supplementary note 7, wherein the data storage means stores the data converted into a coordinate value of a common coordinate system between measurement points by using information indicating the measurement points.

Supplementary Note 9

The inspection system according to any one of Supplementary notes 1 to 8, further including a calculation means for calculating a calculation surface approximated to an original shape of the wall surface, based on the coordinate value of the data included in the point cloud data acquired by the measurement device, wherein the extraction unit extracts the data, based on a distance from the measurement point to the calculation surface.

Supplementary Note 10

The inspection system according to Supplementary note 9, wherein the extraction means extracts the data indicating a shortest distance from the measurement point to the calculation surface.

Supplementary Note 11

The inspection system according to Supplementary note 9 or 10, wherein the calculation unit calculates the calculation surface by using a plurality of pieces of the point cloud data acquired at a plurality of the measurement points.

Supplementary Note 12

An extraction device including:

when a measurement device arranged at a measuring point in an inside of a tunnel is moved to a plurality of the measurement points in an inside of the tunnel, the measurement device having a reference point and being configured to acquire, as point cloud data, a plurality of pieces of data including a coordinate value and a brightness value of a wall surface of the tunnel by using one or more beams irradiated in irradiation directions at a plurality of different angles with respect to the reference point and receiving reflected light of the beam resulting from scanning the wall surface, an extraction means for extracting the data in point cloud data acquired by the measurement device for each measurement point, based on a distance from the measurement point.

Supplementary Note 13

The extraction device according to Supplementary note 12, wherein the measurement device has a rotation center axis passing through the reference point, rotates one or more beams irradiated in irradiation directions at a plurality of different angles with respect to the rotation center axis around the rotation center axis, and receives reflected light of the beam resulting from scanning a wall surface of the tunnel, thereby acquiring the point cloud data.

Supplementary Note 14

The extraction device according to Supplementary note 13, wherein the extraction means extracts data on a vertical plane orthogonal to the rotation center axis.

Supplementary Note 15

The extraction device according to Supplementary note 13 or 14, wherein the point cloud data are acquired by the measurement device at each measurement point when the measurement device is moved by aligning the rotation center axis with a moving direction of the measurement device.

Supplementary Note 16

The extraction device according to any one of Supplementary notes 13 to 15, wherein the point cloud data are acquired by the measurement device at each measurement point when the measurement device is moved by aligning the rotation center axis with a center axis of the tunnel.

Supplementary Note 17

The extraction device according to any one of Supplementary notes 12 to 16, wherein the extraction means extracts data indicating a shortest distance from the measurement point.

Supplementary Note 18

The extraction device according to any one of Supplementary notes 12 to 17, wherein a data storage means is caused to store the data together with information indicating the measurement point.

Supplementary Note 19

The extraction device according to Supplementary note 18, wherein the data storage means is caused to store the data converted into a coordinate value of a common coordinate system between measurement points by using information indicating the measurement points.

Supplementary Note 20

The extraction device according to any one of Supplementary notes 12 to 19, wherein, when a calculation means calculates a calculation surface approximated to an original shape of the wall surface, based on the coordinate value of the data included in the point cloud data acquired by the measurement device, the extraction means extracts the data, based on a distance from the measurement point.

Supplementary Note 21

The extraction device according to Supplementary note 20, wherein the extraction means extracts the data indicating a shortest distance from the measurement point to the calculation surface.

Supplementary Note 22

The extraction device according to Supplementary note 20 or 21, wherein the calculation means calculates the calculation surface by using a plurality of pieces of the point could data acquired at a plurality of the measurement points.

Supplementary Note 23

A measurement method including:

causing a measurement device arranged at a measurement point in an inside of a tunnel, the measurement device having a reference point, to acquire, as point cloud data, a plurality of pieces of data including a coordinate value and a brightness value of a wall surface of the tunnel by using one or more beams irradiated in irradiation directions at a plurality of different angles with respect to the reference point, and receiving reflected light of the beam resulting from scanning the wall surface;

causing a movement means to move the measurement device to a plurality of the measurement points in an inside of the tunnel; and causing an extraction means to extract the data in the point cloud data acquired by the measurement device for each measurement point, based on a distance from the measurement point.

Supplementary Note 24

The inspection method according to Supplementary note 23, further including, by the measurement device having a rotation center axis passing through the reference point, rotating one or more of the beams irradiated in irradiation directions of a plurality of different angles with respect to the rotation center axis around the rotation center axis, and receiving reflected light of the beam resulting from a wall surface of the tunnel, thereby acquiring the point cloud data.

Supplementary Note 25

The inspection method according to Supplementary note 24, further including causing the extraction means to extract data on a vertical plane orthogonal to the rotation center axis.

Supplementary Note 26

The inspection method according to Supplementary note 24 or 25, further including causing the movement means to align the rotation center axis with a moving direction of the measurement device.

Supplementary Note 27

The inspection method according to any one of Supplementary notes 24 to 26, further including causing the movement means to align the rotation center axis with a center axis of the tunnel.

Supplementary Note 28

The inspection method according to any one of Supplementary notes 23 to 27, further including causing the extraction unit to extract data indicating a shortest distance from the measurement point.

Supplementary Note 29

The inspection method according to any one of Supplementary notes 23 to 28, further including causing data storage means to store the data together with information indicating the measurement point.

Supplementary Note 30

The inspection method according to Supplementary note 29, further including causing the data storage means to store the data converted into a coordinate value of a common coordinate system between measurement points by using information indicating the measurement points.

Supplementary Note 31

The inspection method according to any one of Supplementary notes 23 to 30, further including:

causing calculation means to calculate a calculation surface approximated to an original shape of the wall surface, based on the coordinate value of the data included in the point cloud data acquired by the measurement device; and causing the extraction means to extract the data, based on a distance from the measurement point to the calculation surface.

Supplementary Note 32

The inspection method according to Supplementary note 31, further including causing the extraction means to extract the data indicating a shortest distance from the measurement point to the calculation surface.

Supplementary Note 33

The inspection method according to Supplementary note 31 or 32, further including causing the calculation means to calculate the calculation surface by using a plurality of pieces of the point cloud data acquired at a plurality of the measurement points.

Supplementary Note 34

An extraction method including:

when a measurement device arranged at a measurement point in an inside of a tunnel is moved to a plurality of the measurement points in the inside of the tunnel, the measurement device having a reference point and being configured to acquire, as point cloud data, a plurality of pieces of data including a coordinate value and a brightness value of a wall surface of the tunnel by using one or more beams irradiated in irradiation directions at a plurality of different angles with respect to the reference point and by receiving reflected light of the beam resulting from scanning the wall surface, acquiring the point cloud data for each measurement point; and extracting the data in the point cloud data acquired for each of the measurement points, based on a distance from the measurement point.

Supplementary Note 35

The extraction method according to Supplementary note 34, further including, by the measurement device having a rotation center axis passing through the reference point, rotating one or more of the beams irradiated in irradiation directions at a plurality of different angles with respect to the rotation center axis around the rotation center axis, and receiving reflected light of the beam resulting from scanning a wall surface of the tunnel, thereby acquiring the point cloud data.

Supplementary Note 36

The extraction method according to Supplementary note 35, further including extracting data on a vertical plane orthogonal to the rotation center axis.

Supplementary Note 37

The extraction method according to Supplementary note 35 or 36, wherein the point cloud data are acquired by the measurement device at each measurement point when the measurement device is moved by aligning the rotation center axis with a moving direction of the measurement device.

Supplementary Note 38

The extraction method according to any one of Supplementary notes 35 to 37, wherein the point cloud data are acquired by the measurement device at each measurement point when the measurement device is moved by aligning the rotation center axis with a center axis of the tunnel.

Supplementary Note 39

The extraction method according to any one of Supplementary notes 34 to 38, further including extracting data indicating a shortest distance from the measurement point.

Supplementary Note 40

The extraction method according to any one of Supplementary notes 34 to 39, further including causing data storage means to store the data together with information indicating the measurement point.

Supplementary Note 41

The extraction method according to Supplementary note 40, further including causing the data storage means to store the data converted into a coordinate value of a common coordinate system between measurement points by using information indicating the measurement points.

Supplementary Note 42

The extraction method according to any one of Supplementary notes 34 to 41, further including:

causing calculation means to calculate a calculation surface approximated to an original shape of the wall surface, based on the coordinate value of the data included in the point cloud data acquired by the measurement device; and extracting the data, based on a distance from the measurement point to the calculation surface.

Supplementary Note 43

The extraction method according to Supplementary note 42, further including extracting the data indicating a shortest distance from the measurement point to the calculation surface.

Supplementary Note 44

The extraction method according to Supplementary note 42 or 43, further including causing the calculation unit to calculate the calculation surface by using a plurality of the point cloud data acquired at a plurality of the measurement points.

Supplementary Note 45

A non-transitory computer-readable medium storing a program causing a computer to execute:

causing a measurement device arranged at a measurement point in an inside of a tunnel the measurement device having a reference point, to acquire, as point cloud data, a plurality of data including a coordinate value and a brightness value of a wall surface of the tunnel by using one or more beams irradiated in irradiation directions at a plurality of different angles with respect to the reference point and receiving reflected light of the beam resulting from scanning the wall surface; causing a movement means to move the measurement device to a plurality of the measurement points in an inside of the tunnel; and causing an extraction means to extract the data in the point cloud data acquired by the measurement device for each measurement point, based on a distance from the measurement point.

Supplementary Note 46

The non-transitory computer-readable medium storing the program according to Supplementary note 45, wherein the measurement device has a rotation center axis passing through the reference point, rotates one or more of the beams irradiated in irradiation directions at a plurality of different angles with respect to the rotation center axis around the rotation center axis, and receives reflected light of the beam resulting from scanning a wall surface of the tunnel, thereby acquiring the point cloud data.

Supplementary Note 47

The non-transitory computer-readable medium storing the program according to Supplementary note 46, wherein the program causes a computer to execute causing the extraction means to extract data on a vertical plane orthogonal to the rotation center axis.

Supplementary Note 48

The non-transitory computer-readable medium storing the program according to Supplementary note 46 or 47, wherein the program causes a computer to execute causing the movement means to align the rotation center axis with a moving direction of the measurement device.

Supplementary Note 49

The non-transitory computer-readable medium storing the program according to any one of Supplementary notes 46 to 48, wherein the program causes a computer to execute causing the movement means to align the rotation center axis with a center axis of the tunnel.

Supplementary Note 50

The non-transitory computer-readable medium storing the program according to any one of Supplementary notes 45 to 49, wherein the program causes a computer to execute causing the extraction means to extract data indicating a shortest distance from the measurement point.

Supplementary Note 51

The non-transitory computer-readable medium storing the program according to any one of Supplementary notes 45 to 50, wherein the program causes a computer to execute causing data storage means to store the data together with information indicating the measurement point.

Supplementary Note 52

The non-transitory computer-readable medium storing the program according to Supplementary note 51, wherein the program causes a computer to execute causing the data storage means to store the data converted into a coordinate value of a common coordinate system between measurement points by using information indicating the measurement points.

Supplementary Note 53

The non-transitory computer-readable medium storing the program according to any one of Supplementary notes 45 to 52, wherein the program causes a computer to execute:

causing calculation means to calculate a calculation surface approximated to an original shape of the wall surface, based on the coordinate value of the data included in the point cloud data acquired by the measurement device; and causing the extraction means to extract the data, based on a distance from the measurement point to the calculation surface.

Supplementary Note 54

The non-transitory computer-readable medium storing the program according to Supplementary note 53, wherein the program causes a computer to execute causing the extraction means to extract the data indicating a shortest distance from the measurement point to the calculation surface.

Supplementary Note 55

The non-transitory computer-readable medium storing the program according to Supplementary note 53 or 54, wherein the program causes a computer to execute causing the calculation means to calculate the calculation surface by using a plurality of pieces of the point cloud data acquired at a plurality of the measurement points.

Supplementary Note 56

A non-transitory computer-readable medium storing a program causing a computer to execute:

when a measurement device arranged at a measurement point in an inside of a tunnel is moved to a plurality of the measurement points in an inside of the tunnel, the measurement device having a reference point and being configured to acquire, as point cloud data, a plurality of pieces of data including a coordinate value and a brightness value of a wall surface of the tunnel by using one or more beams irradiated in irradiation directions at a plurality of different angles with respect to the reference point and receiving reflected light of the beam resulting from scanning the wall surface, acquiring the point cloud data for each measurement point; and extracting the data in the point cloud data acquired for each of the measurement points, based on a distance from the measurement point.

Supplementary Note 57

The non-transitory computer-readable medium storing the program according to Supplementary note 56, wherein the measurement device has a rotation center axis passing through the reference point, rotates one or more of the beams irradiated in irradiation directions at a plurality of different angles with respect to the rotation center axis around the rotation center axis, and receives reflected light of the beam resulting from scanning a wall surface of the tunnel, thereby acquiring the point cloud data.

Supplementary Note 58

The non-transitory computer-readable medium storing the program according to Supplementary note 57, wherein the program causes a computer to execute extracting data on a vertical plane orthogonal to the rotation center axis.

Supplementary Note 59

The non-transitory computer-readable medium storing the program according to Supplementary note 57 or 58, wherein the point cloud data are acquired by the measurement device at each measurement point when the measurement device is moved by aligning the rotation center axis with a moving direction of the measurement device.

Supplementary Note 60

The non-transitory computer-readable medium storing the program according to any one of Supplementary notes 57 to 59, wherein the point cloud data are acquired by the measurement device at each measurement point when the measurement device is moved by aligning the rotation center axis with a center axis of the tunnel.

Supplementary Note 61

The non-transitory computer-readable medium storing the program according to any one of Supplementary notes 56 to 60, wherein the program causes a computer to execute extracting data indicating a shortest distance from the measurement point.

Supplementary Note 62

The non-transitory computer-readable medium storing the program according to any one of Supplementary notes 56 to 61, wherein the program causes a computer to execute causing a data storage means to store the data together with information indicating the measurement point.

Supplementary Note 63

The non-transitory computer-readable medium storing the program according to Supplementary note 62, wherein the program causes a computer to execute:

causing the data storage means to store the data converted into a coordinate value of a common coordinate system between measurement points by using information indicating the measurement points.

Supplementary Note 64

The non-transitory computer-readable medium storing the program according to any one of Supplementary notes 56 to 63, wherein the program causes a computer to execute:

causing a calculation means calculate a calculation surface approximated to an original shape of the wall surface, based on the coordinate value of the data included in the point cloud data acquired by the measurement device; and extracting the data, based on a distance from the measurement point to the calculation surface.

Supplementary Note 65

The non-transitory computer-readable medium storing the program according to Supplementary note 64, wherein the program causes a computer to execute extracting the data indicating a shortest distance from the measurement point to the calculation surface.

Supplementary Note 66

The non-transitory computer-readable medium storing the program according to Supplementary note 64 or 65, wherein the program causes a computer to execute causing the calculation means to calculate the calculation surface by using a plurality of pieces of the point cloud data acquired at a plurality of the measurement points.

In the examples described above, the programs may be stored by using various types of non-transitory computer readable medium, and provided to a computer. The non-transitory computer-readable media include various types of tangible storage media. Examples of the non-transitory computer-readable media include magnetic recording media (e.g., flexible disks, magnetic tapes, hard disk drives), magneto-optical recording media (e.g., magneto-optical disks), CD-ROM (Read Only Memory), CD-R, CD-R/W, and semiconductor memory (e.g., mask ROM, Programmable ROM (PROM), Erasable PROM (EPROM), flash ROM, Random Access Memory (RAM)). The program may also be provided to the computer by various types of transitory computer readable media. Examples of the transitory computer-readable media include electrical signals, optical signals, and electromagnetic waves. The transitory computer readable medium can supply the program to the computer via a wired communication path such as an electric wire and an optical fiber, or a wireless communication path.

REFERENCE SIGNS LIST

1, 1*a*, 2, 2*a* INSPECTION SYSTEM
10 MEASUREMENT DEVICE
11 LIGHT EMITTING UNIT
12 DETECTION UNIT
20 MOVEMENT UNIT
30 EXTRACTION UNIT
31, 31*a*, 31*b* EXTRACTION DEVICE
40 DATA STORAGE UNIT
50 CALCULATION UNIT
CF CALCULATION SURFACE
CH1, CH2, CH3, CH4, CH5 CHANNEL
LB BEAM
OB MEASUREMENT TARGET
P1, P2 MEASUREMENT POINT
RC ROTATION CENTER AXIS
RB REFLECTED LIGHT
TN TUNNEL
TNC CENTER AXIS
TNI INSIDE
TNO ORIGINAL TYPE
TNW WALL SURFACE

What is claimed is:

1. An inspection system comprising:

a measurement device arranged at a measurement point in an inside of a tunnel, the measurement device having a reference point and being configured to acquire, as point cloud data, a plurality of pieces of data including a coordinate value and a brightness value of a wall surface of the tunnel by using one or more beams irradiated in irradiation directions at a plurality of different angles with respect to the reference point and receiving reflected light of the beam resulting from scanning the wall surface;

a movement unit configured to move the measurement device to a plurality of the measurement points in an inside of the tunnel;

an extraction unit configured to extract the data in point cloud data acquired by the measurement device for each measurement point, based on a distance from the measurement point, and a calculation unit configured to calculate a calculation surface approximated to an original shape of the wall surface based on the coordinate value of the data included in the point cloud data acquired by the measurement device, wherein the extraction unit extracts the data based on a distance from the measurement point to the calculation surface.

2. The inspection system according to claim 1, wherein the measurement device has a rotation center axis passing through the reference point, rotates one or more of the beams irradiated in irradiation directions at a plurality of different angles with respect to the rotation center axis around the rotation center axis, and receives reflected light of the beam resulting from scanning a wall surface of the tunnel, thereby acquiring the point cloud data.

3. The inspection system according to claim 2, wherein the extraction unit extracts data on a vertical plane orthogonal to the rotation center axis.

4. The inspection system according to claim 2, wherein the movement unit aligns the rotation center axis with a moving direction of the measurement device.

5. The inspection system according to claim 2, wherein the movement unit aligns the rotation center axis with a center axis of the tunnel.

6. The inspection system according to claim 1, wherein the extraction unit extracts data indicating a shortest distance from the measurement point.

7. The inspection system according to claim 1, further comprising a data storage unit configured to store the data together with information indicating the measurement point.

8. The inspection system according to claim 7, wherein the data storage unit stores the data converted into a coordinate value of a common coordinate system between measurement points by using information indicating the measurement points.

9. The inspection system according to claim 1, wherein the extraction unit extracts the data indicating a shortest distance from the measurement point to the calculation surface.

10. The inspection system according to claim 1, wherein the calculation unit calculates the calculation surface by using a plurality of pieces of the point cloud data acquired at a plurality of the measurement points.

11. An extraction device comprising, when a measurement device arranged at a measurement point in an inside of a tunnel is moved to a plurality of the measurement points in an inside of the tunnel, the measurement device having a reference point and being configured to acquire, as point cloud data, a plurality of pieces of data including a coordinate value and a brightness value of a wall surface of the tunnel by using one or more beams irradiated in irradiation directions at a plurality of different angles with respect to the reference point and receiving reflected light of the beam resulting from scanning the wall surface, an extraction unit configured to extract the data in point cloud data acquired by the measurement device for each measurement point, based on a distance from the measurement point, wherein, when a calculation unit calculates a calculation surface approximated to an original shape of the wall surface based on the coordinate value of the data included in the point cloud data acquired by the measurement device, the extraction unit extracts the data based on a distance from the measurement point to the calculation surface.

12. The extraction device according to claim 11, wherein the measurement device has a rotation center axis passing through the reference point, rotates one or more of the beams irradiated in irradiation directions at a plurality of different angles with respect to the rotation center axis around the rotation center axis, and receives reflected light of the beam resulting from scanning a wall surface of the tunnel, thereby acquiring the point group data.

13. The extraction device according to claim 12, wherein the extraction unit extracts data on a vertical plane orthogonal to the rotation center axis.

14. The extraction device according to claim 12, wherein the point cloud data are acquired by the measurement device at each measurement point when the measurement device is moved by aligning the rotation center axis with a moving direction of the measurement device.

15. The extraction device according to claim 12, wherein the point cloud data are acquired by the measurement device at each measurement point when the measurement device is moved by aligning the rotation center axis with a center axis of the tunnel.

16. The extraction device according to claim 11, wherein the extraction unit extracts data indicating a shortest distance from the measurement point.

17. The extraction device according to claim 11, wherein a data storage unit is caused to store the data together with information indicating the measurement point.

18. The extraction device according to claim 17, wherein the data storage unit is caused to store the data converted into a coordinate value of a common coordinate system between measurement points by using information indicating the measurement points.

19. An inspection method comprising:

causing a measurement device arranged at a measurement point in an inside of a tunnel, the measurement device having a reference point, to acquire, as point cloud data, a plurality of pieces of data including a coordinate value and a brightness value of a wall surface of the tunnel by using one or more beams irradiated in irradiation directions at a plurality of different angles with respect to the reference point, and receiving reflected light of the beam resulting from scanning the wall surface;

causing a movement unit to move the measurement device to a plurality of the measurement points in an inside of the tunnel; and causing an extraction unit to extract the data in the point cloud data acquired by the measurement device for each measurement point, based on a distance from the measurement point, causing a calculation unit to calculate a calculation surface approximated to an original shape of the wall surface based on the coordinate value of the data included in the point cloud data acquired by the measurement device; and causing the extraction unit to extract the data based on a distance from the measurement point to the calculation surface.

* * * * *